United States Patent [19]

Fennema et al.

[11] Patent Number: 4,915,971

[45] Date of Patent: Apr. 10, 1990

[54] METHOD FOR MAKING AN EDIBLE FILM AND FOR RETARDING WATER TRANSFER AMONG MULTI-COMPONENT FOOD PRODUCTS

[75] Inventors: Owen R. Fennema, Madison, Wis.; Susan L. Kamper, Minneapolis, Minn.; Jeffrey J. Kester, Madison, Wis.

[73] Assignee: Wisconsin Alumni Research Foundation, Madison, Wis.

[21] Appl. No.: 81,828

[22] Filed: Aug. 4, 1987

Related U.S. Application Data

[63] Continuation of Ser. No. 809,531, Dec. 16, 1985, abandoned, which is a continuation-in-part of Ser. No. 628,723, Jul. 9, 1984, abandoned.

[51] Int. Cl.$^4$ .................................................. A23L 1/04
[52] U.S. Cl. ................................... 426/578; 426/573; 426/94; 426/138; 426/89; 426/390; 426/302; 426/517
[58] Field of Search ............... 426/89, 92, 94, 103, 426/138, 106, 415, 578, 302, 307, 112, 125, 517, 658, 661, 390, 573; 264/204, 217, 171

[56] References Cited

U.S. PATENT DOCUMENTS

| | | | |
|---|---|---|---|
| 2,721,142 | 10/1955 | Shinn et al. | 426/92 |
| 2,836,498 | 5/1958 | Fennena | 426/103 |
| 2,909,435 | 10/1959 | Watters . | |
| 3,031,309 | 4/1962 | Bogner | 426/94 |
| 3,323,922 | 6/1967 | Durst . | |
| 3,471,303 | 10/1969 | Hamdy et al. . | |
| 3,471,304 | 10/1969 | Hamdy et al. . | |
| 3,667,963 | 6/1972 | Katter et al. | 426/94 |
| 3,778,515 | 12/1973 | Ashley | 426/112 |
| 3,830,944 | 8/1974 | Dimitriadis et al. | 426/92 |
| 3,997,674 | 12/1976 | Ukai . | |
| 4,066,796 | 1/1978 | McKee | 426/94 |
| 4,293,572 | 10/1981 | Silva | 426/103 |
| 4,401,681 | 8/1983 | Dahle | 426/94 |
| 4,416,904 | 11/1983 | Shannon . | |
| 4,416,910 | 11/1983 | Hayashi et al. | 426/94 |
| 4,515,819 | 5/1985 | Shinriki | 426/94 |
| 4,661,359 | 4/1987 | Seaborne et al. | 426/92 |

FOREIGN PATENT DOCUMENTS

| | | | |
|---|---|---|---|
| 2087185 | 12/1971 | France | 426/415 |
| 51-91359 | 8/1976 | Japan | 426/138 |
| 52-12943 | 1/1977 | Japan | 426/138 |
| 53-34939 | 3/1978 | Japan | 426/138 |
| 53-15100 | 5/1978 | Japan | 426/138 |
| 2105168 | 3/1983 | United Kingdom | 426/92 |

OTHER PUBLICATIONS

Cereal Science Today, 10/65, vol. 10, #9, p. 508 plus.
Industrial & Engineering Chemistry, 10/45, p. 943.
Industrial & Engineering Chemistry, 4/51, p. 911 plus.
Kokko Oblate Co. Publ., p. 2.
Modern Packaging, 9/48, p. 157 plus.
Maintaining Vapor Pressure Gradients in Foods . . . , Kamper, Masters Thesis, U. of Wisconsin, 1983.
J. of Food Science, vol. 49, 1984, (1478 plus).
J. of Food Science, vol. 49, 1984, (1482 plus).
J. of Food Science, vol. 50, 1985, (p. 382 plus).
Industrial Gums, Whistler et al., 1959, Academic Press.
Industrial Gums, Whistler et al., 1973, Academic Press.

*Primary Examiner*—Steven Weinstein
*Attorney, Agent, or Firm*—Lathrop & Clark

[57] ABSTRACT

An edible film for retarding water transfer among components of a multicomponent food product. The film includes a base film having a hydrophilic polymer layer and a base film lipid layer. The base film lipid layer has a hydrophobic surface presented away from the hydrophilic polymer layer. An additional lipid layer is laminated to the hydrophobic surface of the base film lipid layer. The invention further includes a method for making the edible film and a food product incorporating it.

6 Claims, No Drawings

METHOD FOR MAKING AN EDIBLE FILM AND FOR RETARDING WATER TRANSFER AMONG MULTI-COMPONENT FOOD PRODUCTS

RELATED APPLICATION

This is a continuation of application Ser. No. 809,531, filed December 16, 1985, now abandoned which is a continuation-in-part of co-pending patent application Ser. No. 628,723, now abandoned.

FIELD OF THE INVENTION

The present invention relates to edible film barrier materials that can be used to stabilize water vapor pressure and moisture gradients existing between individual components of a multicomponent food product separated by the edible film. "Moisture" as used herein shall refer to liquid water diffused or condensed in various quantities, so that unfrozen pizza sauce or pie filling may be referred to as moist.

BACKGROUND OF THE INVENTION

Deleterious changes in the quality of food products can occur with inadvertent alteration of the water content of the food product. The driving force for water transfer in food products is primarily water partial pressure gradients existing between the food product and the environment or between components of a multicomponent food product. However, even in the absence of water partial pressure gradients, water potentially can migrate via liquid diffusion driven by such forces as water concentration gradients or capillary forces. Hereinafter, "vapor pressure" shall be understood as "partial pressure of water," unless expressly indicated otherwise. The partial pressures involved can be expressed in terms of water activity, ($a_w$), which equals the partial pressure of water exerted by the food material divided by the partial pressure of pure water at the same temperature. Prevention of water transfer between the food product and the environment can be accomplished by using a water vapor impermeable packaging material, either edible or inedible. Prevention of water transfer among individual components of a multicomponent food product is more difficult.

Edible food coatings have been used to retard water transfer within foods. However, the ability of such coatings to maintain vapor pressure gradients among food components for extended periods has not been proven. Those skilled in the art are generally cognizant of the use of carbohydrate, protein, and lipid coatings to retard water transfer in foods. Lipids include hydrophobic compounds such as fats, oils, and waxes and are especially effective in retarding water transfer within foods. However, when lipids such as waxes are applied to food products, the coatings are not continuous. Instead, they contain pinholes and cracks that provide routes for water transfer. Carbohydrate compounds are capable of forming structurally continuous coatings, but these compounds are generally hydrophilic and hence are less effective in retarding water transfer in foods. Therefore, in the past, lipids have been used in conjunction with carbohydrates in order to form a continuous coating to prevent water transfer in foods.

In U.S. Pat. No. 2,909,435 to *Watters, et al.*, a double layer coating was applied sequentially on foods such as raisins. The first layer consisted of a polysaccharide, upon which was applied a second layer of a melted wax composition. The layers were applied to the food by brushing, spraying, or dipping, and they were dried after application. In U.S. Pat. No. 3,323,922 to *Durst*, an aqueous solution was prepared from starch or a carboxymethyl cellulose and a plasticizer, and a lipid was suspended in the solution. The coating was then applied to a food product by brushing, dipping, or spraying, and the coating was dried after application to the food product.

U.S. Pat. Nos. 3,471,303 and 3,471,304 to *Hamdy, et al.*, disclosed two types of coating compositions having as one constituent a cellulose ether. The cellulose ether was plasticized by various fatty acid derivatives such as (1) an ester of a linear polysaccharide having alpha-glucoside linkages and a fatty acid having between 8 to 26 carbon atoms, or (2) a glyceride containing a fatty acid having between 6 to 20 carbon atoms, together with a fatty acid metal salt wherein the fatty acid contains between 16 and 22 carbon atoms. The coating composition in the *Hamdy* patents could be extruded as a non-layered, molten sheet over the food to be coated, and then dried.

U.S. Pat. No. 3,997,674 to *Ukai, et al.*, disclosed an aqueous solution used to coat foods such as fresh fruits. The coating solution contained a water soluble high polymer such as methylcellulose and also hydrophobic substances such as waxes or oils. In *Ukai*, the food product was coated and then dried.

Drying a food coating after application on a food has several disadvantages. It is difficult to control the thickness of such coatings. Furthermore, drying coated foods adds time and hence cost to the manufacture of such foods. Therefore, it would be advantageous to provide off-the-shelf, pre-formed films that could effectively retard or prevent water transfer between components having different $a_w$ values or different moisture contents in a multicomponent food product.

SUMMARY OF THE INVENTION

The invention is summarized in that an edible film for retarding water transfer among components of a multi-component food product includes a film having a hydrophilic polymer layer and a lipid layer. The lipid layer has a hydrophobic surface presented away from the hydrophilic polymer layer.

The invention is further summarized in that a method for making an edible film for retarding water transfer among components of a multicomponent food product includes the following steps. First, a film-forming liquid is prepared by dissolving an edible hydrophilic polymer and mixing an edible lipid in an aqueous solvent system. Then, the film-forming liquid is plated on a supporting surface to a selected depth and dried to gel the polymer and form a film. The depth of film-forming liquid selected is one sufficient to contain enough polymer and lipid to result in a dried film of a desired thickness and to contain enough lipid to form a substantially uniform lipid layer covering that surface of the film which is presented away from the supporting surface. By these means, a film may be formed having a hydrophilic polymer layer and a lipid layer having a hydrophobic surface presented away from the hydrophilic polymer layer.

The invention is further summarized in that a multicomponent food product includes a first component and a second component having water vapor pressures and moisture characteristics such that water transfer would tend to occur from the second component to the first component. The edible film of the invention, as summarized above, is located between the first and second components, with the lipid layer oriented toward the second component.

An object of the present invention is to provide an edible, pre-formed, dry film that can retard moisture and water vapor transfer among components of a multicomponent food product during extended storage times and over changing temperatures and humidities, and yet can be absorbed in the food product or otherwise be rendered unobjectionable during heating or other preparation of the food product.

A further object of the present invention is to provide a method for making films capable of retarding moisture and water vapor transfer among components of a multicomponent food product over extended storage times.

Another object of the present invention is to provide a food product and method to make a food product that includes a plurality of components having different vapor pressures or moisture contents together with edible films separating individual components, which films can maintain existing vapor pressure and moisture gradients for substantial periods of time and thereby retard water transfer among the food components.

Other objects, advantages, and features of the invention will be apparent from the following detailed description.

DESCRIPTION OF THE PREFERRED EMBODIMENT

The present invention includes an edible film for retarding water transfer among components of a multicomponent food product. The film has a hydrophilic polymer layer and a solid or semi-solid, edible lipid layer adhered to the hydrophilic polymer layer. The lipid layer of the film may be enhanced with an additional hydrophobic layer. The films of the invention may be quite thin, ranging from a practical minimum thickness of approximately 0.024 mm to as much as at least 0.10 mm.

The film's hydrophilic polymer layer can be formed from any edible, water-soluble, film-forming carbohydrate that displays thermal gelation in the solvent system used. Suitable polymers include, by way of example only, cellulose ethers such as hydroxypropyl methylcellulose and methylcellulose. The film's lipid layer is comprised of solid or semi-solid, edible lipids such as hydrogenated oils (e.g., palm oil and soybean oil), saturated fatty acids, and edible waxes (e.g., beeswax and paraffin wax). The exposed surface of the lipid layer is hydrophobic. The film itself is an effective barrier to water transfer. When the film is placed between components of food having differing vapor pressures or moisture contents with the hydrophobic surface oriented toward the component of higher vapor pressure or moisture content, the film can maintain the existing vapor pressure or moisture gradient for substantial periods of time, effectively retarding water transfer among the food components.

A one-step method can be used for making a film according to the present invention. In the preferred embodiment of this method, water, a water-soluble, lipid-dissolving solvent such as an alcohol, a hydrophilic polymer, and a lipid are combined to make a film-forming liquid. The lipid-dissolving solvent is present in quantities effective to dissolve at least a portion of the lipid and not to interfere with the dissolving and gelling of the polymer. If an alcohol is used, the usual and preferred alcohol is ethanol. The film-forming liquid is warmed, if necessary, to melt lipids having high melting points. The film-forming liquid is then spread on a supporting surface such as a flat, smooth plate, preferably to a depth of between approximately 0.25 and 0.75 mm. This may be done by any appropriate means for spreading a liquid, including brushing, dipping, spraying, or the use of spreading means comparable to those used in conventional thin layer chromatography. The plate is then dried for a time sufficient to form a cohesive layer on the plate. A substantial portion of the lipids situate themselves at the surface of the drying film-forming liquid. The result is a distinguishable lipid layer demonstrating hydrophobic qualities. The process of spreading the film-forming liquid and drying it so as to form a base film shall be referred to herein as "plating."

Various concentrations of ingredients may be employed in preparing the film-forming liquid, and the liquid may be spread at various thicknesses. Excessive amounts of solvents may lead to inefficient or inconvenient drying periods. However, there is no theoretical point at which the concentrations of polymer and lipid have become too small to allow formation of a base film. The lipid concentration must be sufficient to allow substantially complete coverage of the surface of the base film as it is drying so as to form a hydrophobic surface and must not be so great as to substantially interfere with the formation of a cohesive polymer layer. Concentrations and spreading thicknesses are so adjusted as to produce a dried base film having the strength and handling characteristics desired. A film minimum thickness of approximately 0.013 mm generally is necessary. Film thicknesses of 0.018 to 0.045 mm have been found to be preferred in many applications, although thicker base films may be made as well. When a fatty acid such as stearic or palmitic acid is used as the lipid, a lipid concentration of at least approximately 0.25 mg/cm$^2$ is necessary. Concentrations of 0.50 to 0.80 mg/cm$^2$ are preferred. After drying, the plate is cooled, and the film is removed from the plate. If the film is to be used directly as a water transfer barrier, it can then be positioned on the food material or stored until the food components are assembled.

Improved film mechanical characteristics are obtained when a plasticizer such as polyethylene glycol is added to the film-forming liquid. The films so formulated are generally less fragile and easier to remove from the plate. Additional, desirable effects can be achieved if the alcohol or other lipid-dissolving solvent forming a part of the solvent system of the film-forming liquid is added in sufficient quantities and if the film is dried at sufficiently high temperatures. A concentration of such a solvent can be achieved sufficient to create a solvent system capable of solubilizing some lipids that would otherwise be in an emulsion form. For example, an alcohol concentration in excess of 55% is sufficient if ethanol is used. As the alcohol preferentially evaporates, a point will be reached in which part or all of the lipid is no longer dissolved, and a true suspension again is formed. However, if the hydrophilic polymer can be made to undergo gelation prior to that point, lipid can be trapped in the gel. As a consequence, when alcohol concentrations become so low that the lipid may no longer be held in true solution, at least a portion of the lipid remains widely dispersed throughout and trapped within the gel and the ultimately resulting film. A portion of the lipid sufficient to impart hydrophobic surface qualities does preferentially migrate to the exposed surface and form a moisture resistant barrier. The use of a lipid-dissolving solvent in this manner shall be referred to herein as the "dissolved lipid process."

Lipid globules in a suspension not subject to the dissolved lipid process just described are believed to be larger than the lipid globules formed when the gelation process helps to preserve dispersion of the lipid. It is believed that the smallness of the lipid globules formed when the dissolved lipid process is used contributes to the uniform distribution of lipids at the base film surface and to the resulting creation of a more effective moisture and water vapor-impervious hydrophobic layer. Examination of samples of such base film with the scanning electron microscope has revealed that the lipids at the hydrophobic surface form a lipid layer that does not have a sharply defined boundary with respect to the hydrophilic polymer. Instead, the lipid and the hydrophilic polymers form layers that mutually interpenetrate to some extent, with fingers of lipid extending into the hydrophilic polymer layer and vice versa, thereby enhancing cohesion of the two components.

It should be noted that an edible film utilizing a film made by the dissolved lipid process as described is preferred and believed to exhibit superior mechanical strength and flexibility and water transfer barrier characteristics. However, the invention is not to be understood as limited to the preferred embodiment just described. The aqueous solvent system used to prepare the film-forming liquid may alternatively contain an amount of water-soluble, lipid-dissolving solvent insufficient to dissolve any significant quantity of the base film lipid. Indeed the aqueous solvent system may be entirely without such a lipid-dissolving solvent. In such an event, the lipid is held within the film-forming solution as a suspension. If the lipid is sufficiently divided within the suspension, it is believed that gelation of the hydrophilic polymer may occur in such a manner as to entrap some of the lipid within the hydrophilic polymer and, at any rate, will lead to a boundary between the hydrophilic polymer and the film lipid layer that is characterized by sufficient interpenetration that an at least minimally adequate film is formed capable of being incorporated in a film for retarding water transfer exhibiting the advantages of the invention.

Temperature control is important in preparing a film by the described method. Film-forming liquids containing lipids with high melting points require high temperatures to melt and disperse the lipid. However, excessively high temperatures can result in a low viscosity of the film-forming liquid and poor control over film thickness during plating. Also, when the dissolved lipid process is being used, excessively high temperatures must be avoided during plating, because extremely rapid vaporization of the alcohol or other lipid-dissolving solvent can occur, resulting in bubbles in the film-forming liquid and possible pin holes in the dried film. Nevertheless, the film-forming liquid must be warm enough to prevent solidification of the lipids during plating.

In producing the edible film wherein the lipid layer is enhanced with an additional hydrophobic lipid layer to create a film composed of two layers that are laminated together, the additional lipid layer is laminated to the base layer by any suitable means for applying an additional lipid layer to the hydrophobic surface. Thus, the additional lipid layer may be applied by brushing, dipping, spraying, or otherwise spreading or distributing a liquid or semi-liquid lipid over the hydrophobic surface of the film. The additional lipid layer is then solidified. The solidification may be accomplished by cooling a lipid that has been warmed above its melting temperature. Similarly, a lipid held in an appropriate solution may be deposited by evaporating the solvent. Preferably, the first of these two methods is used.

The additional lipid layer may be made of any lipid of the sort described above. However, although other lipid materials such as fatty acids and triglycerides can be used for forming the additional lipid layer, solidified natural waxes such as beeswax and refined paraffin waxes are preferred. Upon solidification, such waxes form an amorphous or microcrystalline layer that is particularly effective to bar water vapor transfer. This effectiveness is believed to result from the nature of the crystalline structure of the waxes, which is so overlayered as to eliminate or minimize the major route by which water vapor can migrate through a lipid layer, i.e. by penetration between adjacent crystals. It is emphasized that, although this is applicant's best current understanding of the mechanisms involved in the functioning of the additional lipid layer, that understanding is speculative and is offered for explanatory purposes only. It in no way is meant to limit the scope of the invention.

Especially suitable waxes include beeswax, candelilla wax, carnauba wax, rice bran wax, and the refined paraffin and microcrystalline waxes obtained from petroleum, all of which are described in the Food Chemical Codex. If such an edible, food-grade wax is utilized as the additional lipid layer, a thickness of at least approximately 0.011 mm is used, and a thickness in the range of 0.026 mm to 0.047 mm is preferred. The desirable wax content thus is approximately in the range 2.5 mg to 4.5 mg of wax per square centimeter of film. The minimum wax content is approximately 1.0 mg/cm$^2$. The completed laminated film having a wax employed as the additional lipid film has a desired thickness in the range of approximately 0.044 mm to 0.092 mm.

In the fabrication of the embodiment of the edible film described, the preferred film-forming liquid used to make the film is prepared from a blend of cellulose ethers including both methylcellulose and hydroxypropyl methylcellulose. That blend of cellulose ethers is combined with polyethylene glycol and a saturated fatty acid, all in a lipid-dissolving, ethanol-water solvent system. The solvent system may include as much as approximately 80% ethanol and preferably is at least 55% ethanol. The maximum concentration of approximately 80% ethanol is the practical upper limit, beyond which there is a loss of solubility of the cellulose ethers. The film-forming liquid is warmed to the extent necessary to thoroughly dissolve the fatty acids. For example, use of a 55% ethanol solution allows fatty acids in the concentration indicated to be dissolved at about 65° C. The film-forming solution is prepared with appropriate concentrations and then is spread on a glass plate or comparable supporting surface to a depth of approximately 0.25 mm. The film is then dried at an air temperature of approximately 100° C. At that temperature and that thickness, a drying time of 15 minutes usually is sufficient. Thereafter, the film is allowed to cool to room temperature. The wax used as the additional lipid layer may then be deposited upon the hydrophobic surface of the film by any of several means to do so, as is discussed above, at a thickness in the range of 0.026 to 0.047 mm.

A factor of critical importance for the successful low temperature use of films of the embodiment being described is good adhesion between the film and the additional lipid layer. The need for such effective bonding becomes especially apparent at temperatures generally in use for frozen food applications. At those temperatures, poor adhesion or ineffective bonding leads to fracturing of the additional lipid layer and to its subsequent separation from the film. This is accompanied by a reduction of the film's ability to act as a barrier to water vapor. When the lipid used for the additional lipid layer is a wax, good wax adhesion is evidenced by resistance to fracturing and maintenance of water vapor barrier properties upon prolonged storage at temperatures as low as $-40°$ C.

To achieve the good wax adhesion referred to, conformance to the following parameters is believed to be necessary when the preferred film-forming liquid just mentioned is used. The blend of cellulose ethers should include between 50% and 80% methylcellulose, with the balance being hydroxypropyl methylcellulose. The preferred ratio is 70% methylcellulose and 30% hydroxypropyl methylcellulose. The blend of cellulose ethers is believed to maximize bonding of the additional lipid layer to the film while still maintaining satisfactory film-forming properties. Taken by itself, hydroxypropyl methylcellulose has a film-forming capability more effective than that of methylcellulose. However, methylcellulose, being less hydrophilic than hydroxypropyl methylcellulose, adheres more effectively to the additional lipid layer. The blend produces a strong film to which the additional lipid layer bonds well.

The cellulose ethers referred to display gelation when heated in solution. By use of the ethanol-water lipid-dissolving solvent system or comparable system to perform the dissolved lipid process discussed above, thermal gelation of the methylcellulose and hydroxypropyl methylcellulose during the drying phase of the formation of the film, locks a certain percentage of the fatty acid included in the film-forming liquid throughout the bulk of the film and also appears to prevent the fatty acid comprising the hydrophobic lipid layer from agglomerating into relatively large lipid globules. Consequently, the film when dry has distributed within it small fatty acid crystals as integral components of the film. However, the film also has a layer of fatty acid so situated at the surface of the film as to form a hydrophobic surface, but with an intimate physical interinvolvement of the fatty acid, lipid layer with the underlying hydrophilic polymer layer. It is thought that, when wax of the sort referred to above is used for the additional lipid layer and is spread over the film in molten form, the fatty acid crystals embedded within and at the surface of the film first melt beneath the hot wax and then resolidify as the applied wax cools and solidifies. It appears that this contributes to effective bonding between the film and the wax additional lipid layer, probably by the melting of fatty acid crystals at the surface of the film into the wax layer to increase the intimacy of the joining of the film and wax additional lipid layer.

Polyethylene glycol is disclosed above as usefully incorporated into the film-forming liquid as a plasticizer to aid in the removal of dried films from the plate or other substrate upon which they have been formed and otherwise to improve their durability. However, polyethylene glycol also binds to and is miscible with many waxes. Consequently, it is believed that the presence of polyethylene glycol in the film contributes to the intimate physical interaction of the film and the additional lipid layer when that lipid layer is wax, to promote effective adhesion of the additional lipid layer to the film. Once again, the mechanics of this effect are not precisely known, and applicants are presenting only their best understanding of empirically observed results.

Except when otherwise stated expressly, the particular concentrations, pH, temperatures, times, and reagents disclosed above are not critical. Thus, ethanol was disclosed above as usable for converting the film-forming suspension into a true solution. However, the essence of what is needed is a solvent that provides means for dissolving the lipid used in the film and keeping that lipid dissolved until the hydrophilic polymer, whether a cellulose ether or otherwise, has polymerized to form a gel. Thus, the non-aqueous solvent present in the lipid-dissolving solvent system and used as such a means must not interfere with the polymerizing or gelling process and must leave no residue that would be harmful if eaten. It will be apparent that other solvents than ethanol could be so used as a dissolving means, such as acetone, isopropyl alcohol, methyl alcohol, and propyl alcohol. Similarly, polyethylene glycol was disclosed as a suitable plasticizer that also contributed to the adhesion of the additional lipid layer to the film. However, glycerol, propylene glycol, and other similar plasticizers capable of dissolving in high concentration the lipid of the additional lipid layer may be expected to function in a comparable manner.

A multicomponent food product can be made utilizing the film of the invention, as described above. Use of the film is beneficial when a first component of the food product and a second component have water vapor pressures and moisture characteristics such that water transfer would tend to occur from the second component to the first component unless restrained. In the multicomponent food product of the invention, an edible film of the sort described above is located between the first and second components, with the additional lipid layer oriented toward the second component. As a result, water transfer is retarded, and the multicomponent food product may be stored without change from water transfer for longer periods of time than would otherwise be possible.

EXAMPLE 1—ONE-STEP METHOD TO FORM FILM

A film-forming liquid was prepared by dissolving 9 gm of hydroxypropyl methylcellulose in 100 ml of 90° C. distilled water. After the hydroxypropyl methylcellulose was completely in solution, 200 ml of 95% ethanol was added. Next, 1 gram of polyethylene glycol was added to the solution. Finally, 3.4 gm of stearic acid was added to the solution. The solution was warmed to between 70°-75° C. in order to melt and dissolve the stearic acid.

One hundred milliliters of the film-forming solution was added to a thin layer chromatography (TLC) spreader and plated onto three 8 inch by 8 inch glass TLC plates at a thickness of 0.75 mm. The coated plates were then dried in an oven at approximately 90° C. for 15 minutes, by which time a cohesive, edible, film had formed. After drying, the plates were cooled, and the films were peeled from the plates. The films had an average thickness of 0.04 mm and an average stearic acid concentration of 0.8 mg stearic acid per square centimeter of hydroxypropyl methylcellulose layer.

EXAMPLE 2—FABRICATION OF FILMS WITH ADDITIONAL LIPID LAYER

Films were made by methods generally corresponding to that of Example 1. In particular 7 gm of methylcellulose and 3 gm of hydroxypropyl methylcellulose were dissolved in 100 ml of distilled water at 90° C. After complete dissolution of the cellulose ethers, 200 ml of 95% ethanol was added to the solution. This solution was thoroughly mixed. Then 6 gm of polyethylene glycol was added to the solution. Finally, 9 gm of a fatty acid was added and the mixture was warmed to completely dissolve the fatty acid. In replications of this example, stearic acid, palmitic acid, and combinations of the two were used as the fatty acid. The solution so constituted, and at a temperature sufficient to allow the fatty acid to be completely dissolved, constituted a film-forming liquid. The film-forming liquid was subsequently maintained at a temperature of 65±1° C. Air bubbles were removed if necessary by reducing the pressure over the film-forming liquid.

Thirty-five ml of the film-forming liquid was added to a TLC spreader. The film-forming liquid was spread onto four 8×8 inch TLC glass plates of conventional design, the film-forming liquid being spread at a thickness of approximately 0.25 mm. The film-forming liquid was then dried in an oven at 100° C. for 15 minutes to produce a cohesive cellulose ether-polyethylene glycol-fatty acid film. After the drying procedure, the plates were cooled to room temperature. The dried films had an average thickness of 0.020 mm and an average fatty acid concentration of 0.60 mg/cm$^2$ of film.

Refined white beeswax was used as the lipid of the additional lipid layer. Molten beeswax was spread over the surface of the dried films before their removal from the plates. The TLC spreader was preheated to 180° C. and set to spread the molten beeswax at a thickness of approximately 0.035 mm. When the molten beeswax had so cooled as to solidify, the resulting film consisting of the film with the applied additional lipid layer was peeled from the glass plate. Thickness of the resulting film averaged 0.055 mm. Concentration of beeswax averaged 3.4 mg/cm$^2$ of film.

EXAMPLE 3—PREPARATION OF FOOD PRODUCT (HYPOTHETICAL)

A food prepared in accordance with the present invention could include a plurality of components having different vapor pressures and/or moisture contents, such as pizza or filled pie crusts. Preferably, an edible film prepared in accordance with the present invention would be pre-formed and then positioned so as to separate the individual components. Such edible films would include a film having a hydrophilic polymer layer and a lipid layer adhered to and partly intermixed with the hydrophilic polymer layer such that the base film, comprising the hydrophilic polymer layer and the lipid layer, would have a preferred thickness in the range of 0.018 mm to 0.045 mm. The film lipid layer preferably would have a concentration of at least approximately 0.5 mg lipid per square centimeter of hydrophilic polymer layer. An additional lipid layer would be laminated to the exposed, hydrophobic surface of the film lipid layer and would be oriented toward the food component having the higher vapor pressure or moisture content, such as a pizza sauce or pie filling when compared to a crust. With this orientation, the film could maintain an existing food component vapor pressure or moisture gradient for substantial periods of time, thereby retarding water transfer from the component having a higher vapor pressure or moisture content to the component having a lower vapor pressure or moisture content. The film would be absorbed into the component layers upon heating or other cooking preparation exceeding 70° C.

EXAMPLE 4—PIZZA FOOD PRODUCT

A conventional French bread pizza food product consists of a loaf of French bread which is sliced horizontally to reveal the interior crumb structure, upon which is placed a mixture of tomato sauce, cheese, spices, and vegetables. The product conventionally is shrink wrapped and blast frozen. It then may be stored in frozen storage for a substantial period of time during distribution and prior to consumption by the consumer. A major sensory defect which develops during frozen storage is sogginess of the bread. This occurs as a result of water transfer from the high moisture tomato sauce to the lower moisture bread. The driving force for water transfer in this particular case is not a vapor pressure gradient between sauce and bread, since the water activities of the two components in the frozen state are essentially identical. Instead, other mechanisms of water transfer are operative, such as liquid diffusion caused by an unfrozen water concentration gradient, liquid diffusion caused by the force of gravity acting upon unfrozen water, and liquid diffusion caused by capillary suction. The latter mechanism is probably the predominant driving force for water transfer considering the crumb structure at the bread-sauce interface.

Regardless of the nature of the driving force for water transfer, the bread absorbs water during extended frozen storage of a French bread pizza food product, thereby limiting shelf life and consumer acceptability. It was found that transfer of water into the crumb structure of the bread can be significantly impeded by positioning a pre-formed, edible film prepared in accord with the present invention so as to separate the tomato sauce and bread components. The films used in this particular example were prepared generally by the method of Example 2. The dried films had an average thickness of 0.020 mm and average fatty acid concentration of 0.60 mg/cm$^2$ of film. The additional hydrophobic layer laminated to the film consisted of refined white beeswax, applied at a thickness of approximately 0.035 mm. Concentration of beeswax averaged 3.4 mg/cm$^2$ of film. Total thickness of the resulting film averaged 0.055 mm.

French bread pizza food products were assembed by positioning a 4½"×4½" piece of the pre-formed film upon the surface of the exposed crumb of a like-sized piece of French bread, the hydrophobic beeswax surface oriented up and the hydrophilic cellulose ether layer oriented toward the bread. Twenty-two grams of a commercial pizza sauce were deposited upon the edible film and spread evenly over the surface. Initial moisture contents of bread and sauce were 40.4±0.2% (mean±standard deviation) and 83.5±0.5%, respectively. Hence the initial water concentration gradient between sauce and bread was 43.1%. Assembled samples of French bread pizza were overwrapped with a commercial packaging film, sealed, and blast frozen. Samples were subjected to accelerated shelf life testing at −6.7° C. for nine weeks.

Following completion of the shelf life test, the French bread pizza samples were prepared for evaluation by baking in a conventional oven for 10 minutes at 177° C., whereupon the edible film was absorbed into the component layers. The edible film positioned at the interface between sauce and bread provided an effective impediment to movement of water into the bread. Sensory evaluation of the baked product by a trained panel of analysts revealed that desirable sensory attributes of freshly prepared product were maintained in the stored product throughout the storage period. Specifically, bread sogginess was found not to increase during storage, and the overall preference remained equal to the fresh product throughout the nine week storage period. These sensory results exemplify the value of the present edible film invention in regard to minimizing deleterious changes in food product quality caused by water transfer.

It is to be understood that modification of the above-described edible film, method for making an edible film, food product, or method of making a food product is possible within the spirit of the present invention. Thus, the invention is not limited to the above-described preferred embodiments. Instead, it embraces such modified forms thereof as come within the scope of the following claims.

What is claimed is:

1. A method for making an edible film and for retarding water transfer among components of a multi-component food product, the method comprising the steps of:
   (a) preparing a film-forming liquid by mixing an edible hydrophilic polymer that displays gelation and an edible lipid which is added in an amount sufficient to allow substantially complete coverage of the surface of the hydrophilic polymer when said film-forming liquid is dried by heat, said mixing of said polymer and said lipid occurring in an aqueous solvent system containing an alcohol;
   (b) plating the film-forming liquid on a non-food supporting surface to a depth such that upon drying of said film-forming liquid, a film of desired thickness is obtained, and drying the film-forming liquid on said surface to form a cohesive film such that the depth of the film-forming liquid selected is sufficient to contain enough polymer and lipid to result in a dried barrier film of said desired film thickness and such that the film comprises a hydrophilic polymer layer adjacent to the supporting surface and a hydrophobic lipid layer presented away from the supporting surface, the lipid layer having a concentration of at least approximately 0.8 milligrams lipid per square centimeter of hydrophilic polymer layer;
   (c) removing the film from the supporting surface; and
   (d) placing the film between food components that have different vapor pressures relative to each other such that said hydrophobic lipid layer is oriented toward the food components having the higher vapor pressure such that moisture transfer from the food components having a higher vapor pressure to food components having a lower vapor pressure is effectively retarded during an extended period of storage and upon heating will be consumable with the separated food components.

2. The method of claim 1 wherein the hydrophilic polymer is a water-soluble, film-forming carbohydrate.

3. The method of claim 1 wherein the aqueous solvent system includes water and alcohol and the lipid is selected from the group consisting of hydrogenated oils, saturated fatty acids and edible waxes.

4. The method of claim 1 wherein the step of preparing the film-forming liquid includes dissolving polyethylene glycol in the solvent system.

5. The method of claim 1 wherein the hydrophilic polymer is selected from the group consisting of starch, cellulose ethers and albumen.

6. A method for making an edible film and for retarding water transfer among components of a multi-component food product, the method comprising the steps of:
   (a) preparing a film-forming liquid by mixing an edible hydrophilic polymer that displays gelation, the hydrophilic polymer being selected from the group consisting of starch, cellulose ethers, and albumen and an edible lipid which is added in an amount sufficient to allow substantially complete coverage of the surface of the hydrophilic polymer when said film forming liquid is dried by heat, the lipid being selected from the group consisting of hydrogenated oils, saturated fatty acids and edible waxes, said mixing of said polymer and said lipid occurring in an aqueous solvent system including water, alcohol and polyethylene glycol;
   (b) plating the film-forming liquid on a non-food supporting surface to a selected depth such that upon drying of said film-forming liquid, a film of desired thickness is obtained, and drying the film forming liquid on said surface to form a cohesive film such that the depth of the film-forming liquid selected is sufficient to contain enough polymer and lipid to result in a dried barrier film of said desired film thickness, and such that the film comprises a hydrophilic polymer layer adjacent to the supporting surface and a hydrophobic lipid layer presented away from the supporting surface, the lipid layer having a concentration of at least approximately 0.8 milligrams lipid per square centimeter of hydrophilic polymer layer;
   (c) removing the film from the supporting surface; and
   (d) placing the film between food components that have different vapor pressures relative to each other such that said hydrophobic lipid layer is oriented toward the food components having the higher vapor pressure such that moisture transfer from the food components having the higher vapor pressure to food components having a lower vapor pressure is retarded during an extended period of storage and upon heating will be consumable with the separated food components.

* * * * *

UNITED STATES PATENT AND TRADEMARK OFFICE
CERTIFICATE OF CORRECTION

PATENT NO. : 4,915,971

DATED : April 10, 1990

INVENTOR(S) : Owen R. Fennema, et al

It is certified that error appears in the above-identified patent and that said Letters Patent is hereby corrected as shown below:

On the title page item [75] delete the following inventor:

Jeffrey J. Kester, Madison, Wis.

Column 9, line 56 "base" should be deleted.

Signed and Sealed this

First Day of December, 1992

Attest:

DOUGLAS B. COMER

Attesting Officer

Acting Commissioner of Patents and Trademarks